Jan. 2, 1923.
M. J. DAVIS.
ANTISKIDDING DEVICE.
FILED MAR. 21, 1922.
1,440,660
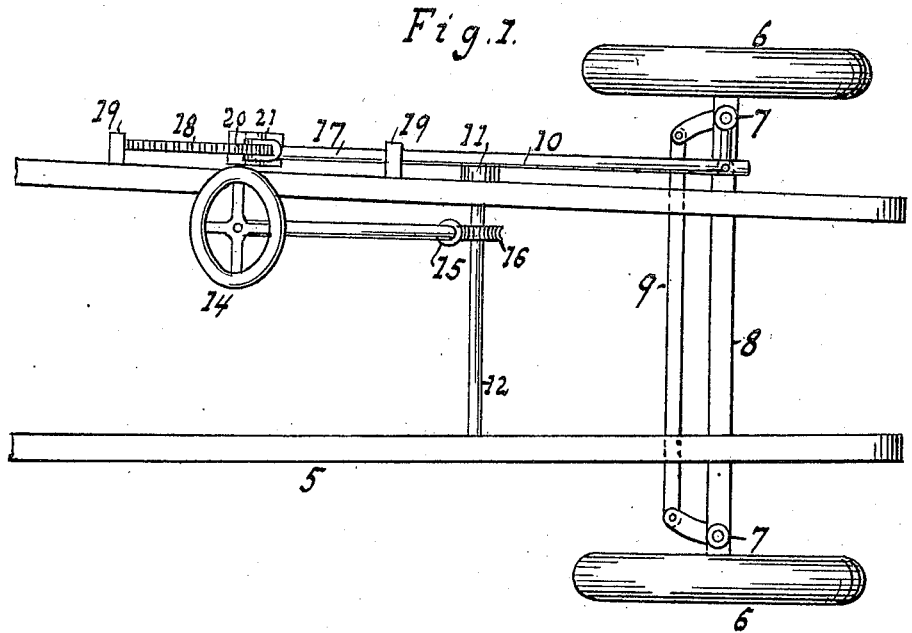
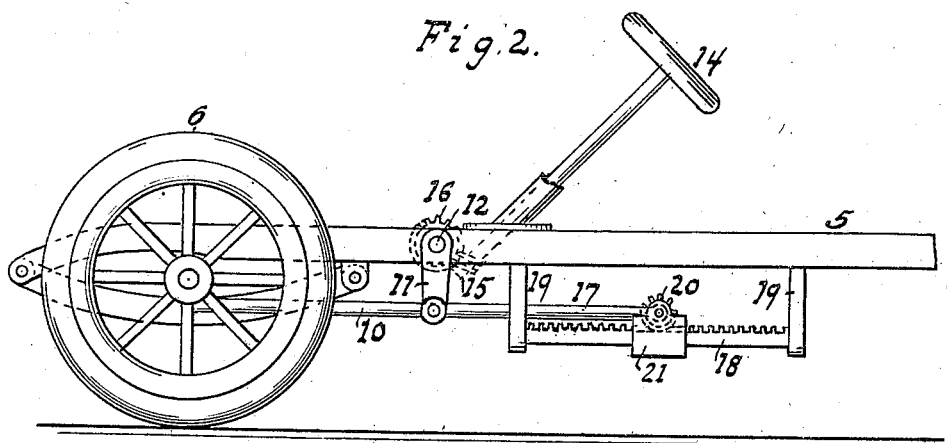
INVENTOR
Michael J. Davis
BY
ATTORNEYS Patented Jan. 2, 1923.

1,440,660

UNITED STATES PATENT OFFICE.

MICHAEL J. DAVIS, OF BROOKLYN, NEW YORK.

ANTISKIDDING DEVICE.

Application filed March 21, 1922. Serial No. 545,624.

*To all whom it may concern:*

Be it known that I, MICHAEL J. DAVIS, a citizen of the United States, residing at Brooklyn, in the county of Kings and State of New York, have invented new and useful Improvements in Antiskidding Devices, of which the following is a specification.

This invention relates essentially to a device for preventing the rear wheels of a motor car from skidding and it includes means controlled by the oscillation of the front wheels when steering to prevent lateral slip of the rear of the car.

The invention is designed to provide means actuated by the operation of the steering hand wheel and coacting with the chassis for preventing the rear wheels from sideslipping.

It is well-known that when the steering gear is given a sudden or sharp inclination it causes the rear of the car especially on a slippery roadway, to side-slip; and it is the object of the present invention to obviate this by a device brought into action by the steering gear.

The novel features of the invention are more fully described in the following specification and claims and illustrated in the accompanying drawing, in which:

Fig. 1, represents a plan view of the front portion of an automobile.

Fig. 2, is a side elevation of the same.

In the drawing the numeral 5 designates a frame or chassis and 6 are the front wheels. These wheels are oscillated to steer a car in any direction by being mounted on knuckle joints 7 connected to an axle 8 fixed to the frame. A cross tube 9 couples the two knuckle joints together so that they will work in unison, to steer both wheels. A drag link 10 is actuated by a crank 11 fulcrumed at 12 to the chassis, and a hand wheel 14 with a worm 15 engaging a pinion 16 mounted on the fulcrum is operated to steer the car as is well-known.

The means for preventing rear side-slip of the car consists in having the drag link extended as shown at 17 so that it will form a lever to compensate for the sudden turning movement of the front wheels when steering to quickly turn the car out of a straight path. A gear rack 18 for supporting and guiding the lever is secured by means of hangers or brackets 19 to the chassis and the rack is engaged by a pinion 20 rotatively connected to the rear end of the lever while a slide 21 guides the gear in a rectilinear path. By operating the hand wheel for steering the car it rocks the connecting rod and the pinion rolls along the rack eliminating side-slip of the rear wheels in turning corners or a declivity in the road. It is well known that the side slip of the car occurs under several conditions such as when the brake is suddenly thrown in, when the clutch is suddenly thrown in or out, and when the steering wheel is given a sudden or sharp inclination. In the latter instance any inclination of the steering wheels transmits a side pressure on all the wheels and the frame, thus producing side slip or skidding. The side strain on the frame tends to lock the pinion in the rack thereby holding the front wheels in line just as an expert driver would do if he thought quick enough to turn the front wheels in the same direction in which the car is skidding. The device also comes into action if the front wheels strike an obstruction or if the car is going straight ahead and the rear of the car begins to side slip as for instance on wet or slippery pavements or in a declivity. The device can be enclosed in a casing to prevent any dust or dirt from settling on the actuating parts.

I claim:

1. In an anti-skidding device the combination with a frame provided with devices for steering an automobile, of a guide member carried by the frame, a rotary member slidingly mounted on the guide, and means controlled by the steering devices for actuating the rotary member.

2. In an anti-skidding device the combination with a frame provided with devices for steering an automobile, of a rack secured to the frame, a pinion adapted to engage the rack, and automatic means controlled by the steering devices for actuating the pinion.

3. In an anti-skidding device the combination with a frame provided with devices including a drag link for steering an automobile, of a rack secured to the frame, a slide mounted on the rack, a pinion carried by the slide to engage the rack, and means controlled by the steering devices for actuating the pinion.

4. In an anti-skidding device the combination with a frame provided with devices including a drag link for steering an automobile, of a rack secured to the frame, a slide mounted on the rack, a pinion carried by the slide to engage the rack and means connecting the drag link of the steering devices with the pinion.

In testimony whereof I have hereunto set my hand in the presence of two subscribing witnesses.

MICHAEL J. DAVIS.

Witnesses:
  INEZ M. SCHOMBS,
  WILLIAM MILLER.